Nov. 27, 1923.　　　　1,475,478
I. P. ENGLE
ANTISKID CHAIN
Filed Jan. 9, 1922

WITNESS
A.E. Alberg.

INVENTOR
IRA P. ENGLE
BY
White Prott Evans
his ATTORNEYS

Patented Nov. 27, 1923.

1,475,478

UNITED STATES PATENT OFFICE.

IRA P. ENGLE, OF YDALPOM, CALIFORNIA.

ANTISKID CHAIN.

Application filed January 9, 1922. Serial No. 527,862.

*To all whom it may concern:*

Be it known that I, IRA P. ENGLE, a citizen of the United States, and a resident of Ydalpom, county of Shasta, and State of California, have invented new and useful Antiskid Chains, of which the following is a specification.

My invention relates to anti-skidding devices and one of the objects of the invention is to provide an anti-skidding device cheaply made from chains and readily applicable to and detachable from a vehicle wheel.

My invention possesses other objects and features of advantage, some of which, with the foregoing, will be set forth in the following description of the invention. It is to be understood that I do not limit myself to the showing made by the said description as I may adopt variant forms of the invention within the scope of the claims.

Figure 1:
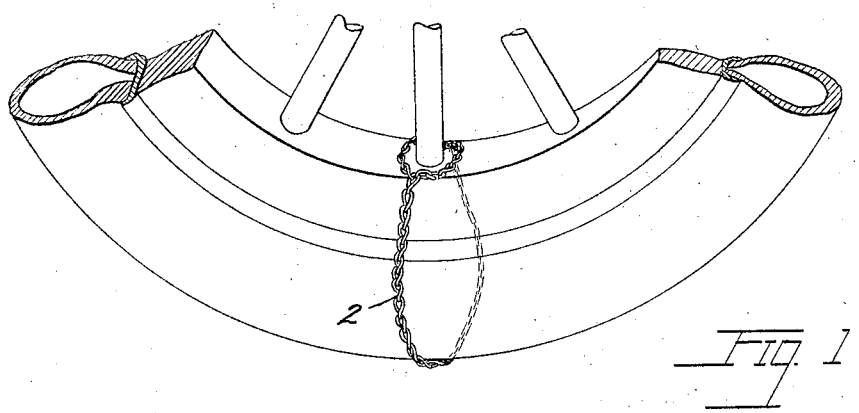
Figure 2:
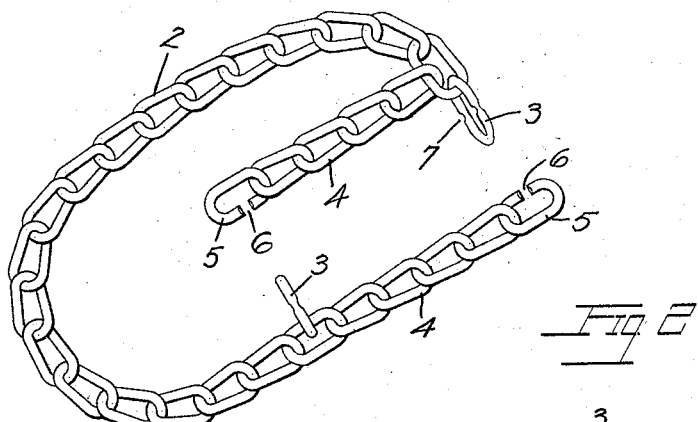
Figure 3:
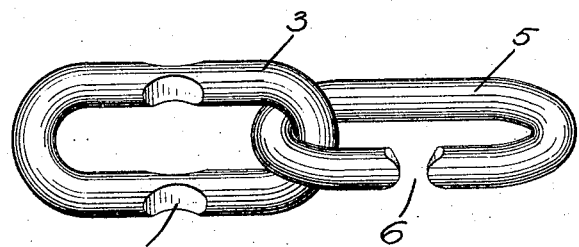

Referring to the drawings, Fig. 1 is a perspective view of a portion of a vehicle wheel with the anti-skid-chain of my invention applied thereto. Fig. 2 is a perspective view of the anti-skid chain of my invention. Fig. 3 is a perspective on a larger scale of the fastening links of my device.

In general terms the device of my invention comprises a short length of chain terminating in two branches at each end, one branch of each end comprising a C-shaped link that is to say a link formed like the letter C and with an opening in the side thereof. The other branch comprises a complete link having grooves in the side thereof to permit the C-shaped link to be engaged therein. The branches may be of equal length or, as shown in Fig. 2, one branch at each end may be but a single link, the other branch comprising a number of links.

In applying the antiskid chain to a wheel, the chain is thrown about the tire and felloe and the C-shaped link at one end engaged in the grooved link at the other end on, one side of the spoke, and on the other side of the spoke the other branches are similarly connected. Thus applied the chain passes around the tire and felloe and encloses the spoke. It requires but a few seconds to engage the C-shaped link with the grooved link and one of my devices is applied opposite every spoke or every other spoke about the wheel as may be desired.

More particularly my device comprises a length of chain 2, terminating at each end in branches comprising the link 3 and the links 4 which terminate in C-shaped link 5. The C-shaped link 5 consists of an elongated link having a small opening 6 in the middle of one of its long sides. The amount of the opening is less than the thickness of the body of the link so as to prevent disengagement of the link from the next succeeding link of the chain. Preferably the ends of the C-shaped link adjacent the opening 6 are tapered. The grooved link 3 comprises an elongated complete link in which grooves 7 are oppositely arranged transversely across the central portion of at least one of its sides. Preferably both sides are so grooved and the shape of the groove is such as to permit the link at this point to be passed thru the opening 6 in the C-shaped link.

In applying the chain to the wheel, as indicated in Fig. 1, the C-shaped link at one end of the chain is engaged with the grooved link at the other end of the chain on one side of the spoke, the C-shaped link and grooved link of the other branches being similarly engaged on the opposite side of the spoke. The normal position of the chain then keeps the links engaged and in the position indicated in Fig. 3, in which disengagement cannot occur.

While I have proposed to use my chain chiefly on trucks, for which it is particularly adapted because it may be applied without jacking up the wheels, yet it is also applicable to any motor vehicle, and users of passenger cars will, no less than truck operators, appreciate the ease with which my chain may be applied or detached without the use of tools or jack.

I claim:

1. An anti-skid device comprising a length of chain, a C-shaped link on each end of said chain and a grooved link adjacent each end engageable with the C-shaped link on the opposite end.

2. An anti-skid device comprising a length of chain terminating in two branches at each end, one branch of each end comprising a C-shaped link and the other branch comprising a grooved link engageable in the C-shaped link at the other end of the chain.

3. An anti-skid device comprising a length of chain terminating in two branches at each end, each of two of said branches comprising a C-shaped link, and each of the other two branches comprising a grooved link engageable in one of the C-shaped links.

In testimony whereof, I have hereunto set my hand.

IRA P. ENGLE.